US005394179A

United States Patent [19]

Vandagriff et al.

[11] Patent Number: 5,394,179

[45] Date of Patent: Feb. 28, 1995

[54] STIMULATOR FOR CONTINOUS INK PRINT HEAD

[75] Inventors: Randy D. Vandagriff, Dayton; David J. Stephens, Springboro; Frank L. Reynolds, New Carlisle, all of Ohio

[73] Assignee: Scitex Digital Printing, Inc., Dayton, Ohio

[21] Appl. No.: 855,191

[22] Filed: Mar. 20, 1992

[51] Int. Cl.[6] .......... G01D 15/18

[52] U.S. Cl. .......... 347/70; 347/48

[58] Field of Search .......... 347/70, 48, 68

[56] References Cited

U.S. PATENT DOCUMENTS

| | | | |
|---|---|---|---|
| 4,563,688 | 1/1986 | Braun . | |
| 4,646,104 | 2/1987 | Braun | 346/1.1 |
| 4,683,477 | 7/1987 | Braun et al. . | |
| 4,999,647 | 3/1991 | Wood et al. | 346/75 |

FOREIGN PATENT DOCUMENTS

| | | | |
|---|---|---|---|
| 5-000511 | 1/1993 | Japan | 347/70 |
| 5-042674 | 2/1993 | Japan | 347/70 |

*Primary Examiner*—R. L. Moses

*Attorney, Agent, or Firm*—Barbara Joan Haushalter

[57] ABSTRACT

A stimulator for a continuous ink jet print head is fabricated by providing a surface roughness of between 100 and 200 microinches on the surface of the stimulator body and attaching a piezoelectric transducer strip to the bōdy using an acrylic cement having a viscosity of between 2 and 100 centipois. The resulting stimulator exhibits improved lifetime with acceptable acoustic properties.

6 Claims, 2 Drawing Sheets

STIMULATOR FOR CONTINOUS INK PRINT HEAD

FIELD OF THE INVENTION

The present invention relates to continuous ink jet printers and more particularly to improvements in a resonant stimulator employed in the print head of such a printer.

BACKGROUND OF THE INVENTION

In continuous ink jet printing, electrically conductive ink is supplied under pressure to a manifold region that distributes the ink to a plurality of orifices, typically arranged in a linear array(s). The ink discharges from the orifices and filaments which break into droplet streams. Individual droplets in the streams are selectively charged in the region of the break-off from filaments, and charged drops are deflected by electrostatic forces from their original trajectories. The deflected drops may be caught and recirculated and the undeflected drops allowed to proceed to a print receiving medium.

To selectively apply charge to the ink droplets, it is necessary to accurately control the locations that the ink droplets break-off from the filaments. Drop break-off can be controlled by applying a stimulating energy of predetermined frequency and amplitude to the ink filaments. Such stimulation controls not only the break-off point, but also the drop size and spacing as well. U.S. Pat. No. 4,999,647 issued Mar. 12, 1991 to Wood et al discloses an ink jet print head wherein stimulation is achieved simultaneously in a long row (4 inches) of ink jets. The stimulator disclosed by Wood et al employs a long rectangular body of high acoustic Q material such as stainless steel. A plurality of slots are formed in the body to discourage vibration in the longitudinal mode. A plurality of elongated piezoelectric strips are affixed to body in pairs on opposing surfaces between the slots. The piezoelectric strips are driven synchronously to excite the stimulator in a direction parallel with the ink jets. The strips of piezoelectric material are adhered to the sides of the stainless steel block with a thin layer of epoxy having a high modulus of elasticity. Unfortunately, it has been found that after many hours of operation, such epoxy bonds have begun to fail, resulting in a failure of stimulation in the print head.

SUMMARY OF THE INVENTION

It is therefore the object of the present invention to provide an improved stimulator for a continuous ink jet print head, and more particularly a stimulator having improved durability.

A stimulator according to the present invention includes a body of high acoustic Q material such as stainless steel having a surface finish of 100 to 200 microinches roughness and a plurality of piezoelectric strips fixed to the surface by an acrylic adhesive having an uncured viscosity of between 2 and 100 centipois.

MODES OF CARRYING OUT THE INVENTION

Figure 1:
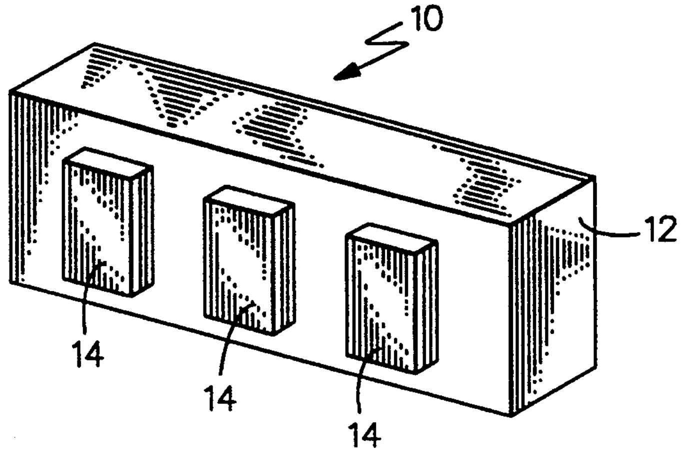
FIG. 1 is a schematic perspective view of a stimulator according to the present invention.

Referring to FIG. 1, a schematic diagram of the stimulator for a continuous ink print head is shown. The stimulator, generally designated 10, includes a body of high acoustic Q material 12 such as stainless steel. One or more piezoelectric transducers 14 are affixed to the side of body 10. Similar piezoelectric transducers may be affixed to the opposite side of body 12.

The body 12 may comprise an elongated body of the type shown in U.S. Pat. No. 4,999,647 or a shorter body of the type shown in U.S. Pat. No. 4,646,104. The body 12 may be provided with slots (not shown) as taught in the '647 patent. The body may also define an ink cavity as shown in the '647 and '104 patents.

It will be understood that the stimulator 10 is employed with other ink jet components such as a charge plate, drop catcher, media drive system and data handling and machine control electronics (not shown) which also operate on the drop stream to effect ink jet printing.

Figure 3:
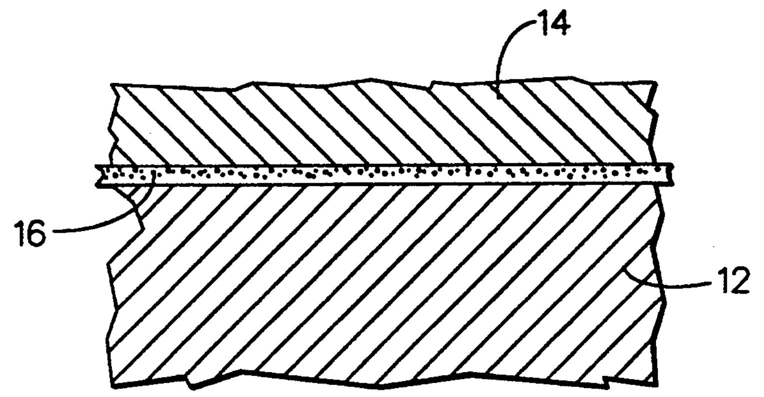
FIGS. 3, 4 and 5 are schematic diagrams of microscopic cross-sections of the interface between a stimulator body and the piezoelectric strip used to show the effects of surface roughness on acoustic contact between the piezoelectric strip and the stimulator body.
Figure 4:
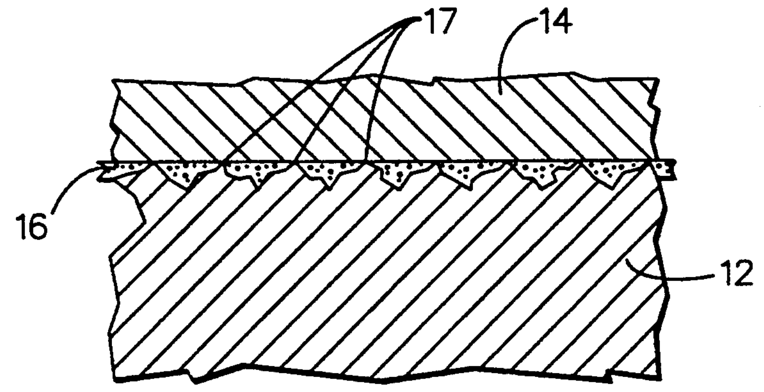
Figure 5:
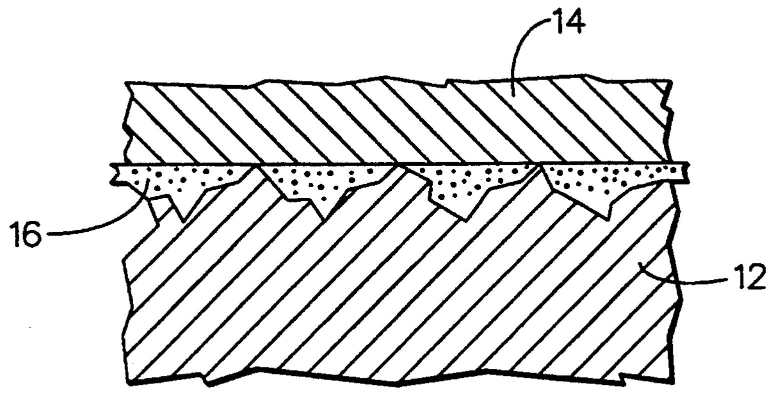

In attempting to improve the bond between the piezoelectric strips 14 and stimulator body 12, several problems were encountered. It was discovered that an acrylic cement such as cyanoacrylate having an uncured viscosity (i.e. a viscosity at the time of application of the cement) of between 2 and 100 centipois would produce an improved bond between the strip 14 and the stimulator body 12. Unfortunately, the acoustic properties of the acrylic cement were found to be less than ideal for acoustically coupling the vibrations of the piezoelectric strip 14 to the stimulator body 12 and the stimulation performance was found to suffer. It was then discovered that if a surface roughness in an effective range of between 100 and 200 microinches RMS were provided on the bonding surface of the body 12, a good acoustic coupling could be achieved. FIG. 3 is a greatly magnified partial cross-section of the region of bonding between the body 12 and the piezoelectric strip 14. The surface finish on body 12 as shown in FIG. 3 of approximately 50 microinches RMS is shown at a magnification in which the surface finish appears relatively smooth. This finish of 50 microinches RMS is typical of the surface finish on the prior art devices. As shown in FIG. 3, the layer of cured cement 16 substantially totally separates the body 12 from the strip 14. If the surface of the body 12 is roughened as shown in FIG. 4, by a proper amount, for example in the range of between 100 and 200 microinches is provided on the surface of body 12 in combination with the proper viscosity cement, a sufficient number of peaks 17 on the surface of the body 12 will penetrate substantially completely through the cement layer 16 to make intimate acoustic contact with the piezoelectric strip 14. However, as shown in FIG. 5, where a surface roughness in the neighborhood of 500 microinches RMS is shown, if the surface is too rough, insufficient acoustic contact is made and performance of the resonator suffers. It has been discovered according to the present invention that the surface roughness of between 100 and 200 microinches RMS is ideal for performance of the resonator and adherence to the resonator by the piezoelectric strip.

Figure 2:
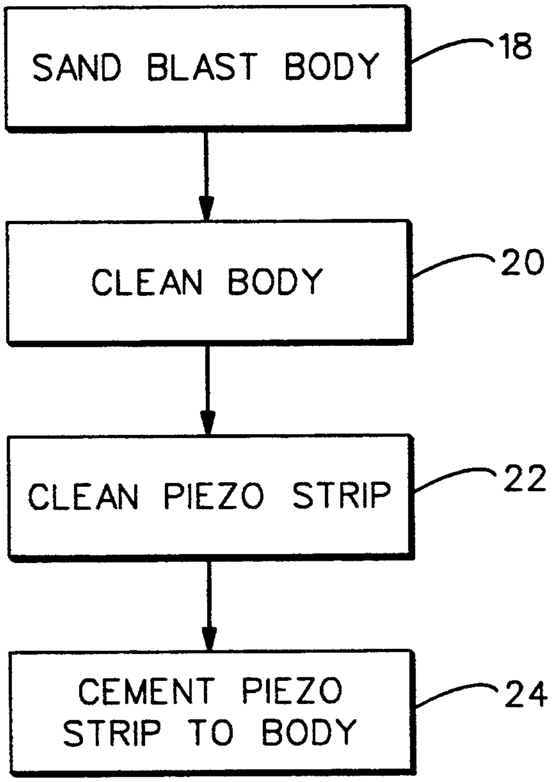
FIG. 2 is a flow chart showing the steps in the process of making a stimulator according to the present invention.

As shown in FIG. 2, a stimulator according to the present invention was prepared as follows: a machined stimulator body of stainless steel, having a finish surface roughness of approximately 50 microinches RMS as a result of the machining was subjected to sandblasting (18) using aluminum oxide number 24 grit in a Trinco blaster at an operating pressure of 75 psi to produce a finish of 171 microinches RMS as measured by a Bendix Profilometer. The body 12 was then subjected to a cleaning process (20) in a Branson ultrasonic cleaning unit using Freon TMS. The body 12 was placed in the vapor side of the ultrasonic cleaning unit for one minute and then moved to the liquid side for 1 hour, and back to the vapor side for 1 minute. The body 12 was then placed in a holding fixture and the bonding surface area was wiped with isopropyl alcohol. While sufficient time was allowed for drying the bonding surface, the piezoelectric strip 14 was cleaned (22) by wiping the surface using isopropyl alcohol. Preferably, oxide is removed from the bonding surface of the piezoelectric strip 14 with a coarse rubber eraser and rinsed with isopropyl alcohol. The piezoelectric strip was placed on the bonding fixture and acrylic cement having a viscosity of 2 centipois was distributed evenly across the bonding surface of the piezoelectric strip using a dispensing needle on the top of the container. Acceptable acrylic adhesives have been found to be 910 adhesive available from Permabond International having a viscosity of 100 cps and 101 adhesive available from Permabond International having a viscosity of 2 cps. Finally, the piezoelectric strip 14 was bonded to the body 12 (24 by clamping the piezoelectric strip to the body 12 for a time sufficient to allow curing of the acrylic cement.

The resulting stimulator was operated and found to have a greatly improved lifetime over the prior art stimulators and acoustic performance was found to be quite satisfactory.

Advantages

The stimulator and bonding method of the present invention results in repeatable and improved bond lifetimes while preserving desirable acoustic properties of the stimulator.

We claim:

1. A stimulator for an ink jet print head, comprising:

(a) a body of high acoustic Q material having a surface finish in the range of 100 to 200 microinches RMS; and (b) a plurality piezoelectric strips attached to said body by an acrylic cement-having an uncured viscosity of between 2 and 100 centipois.

2. The stimulator claimed in claim 1, wherein said high acoustic Q material is stainless steel and wherein said surface finish is a sandblasted finish.

3. The stimulator claimed in claim 1, wherein said acrylic cement is cyanoacrylate having an uncured viscosity of 2 centipois.

4. A method of making a stimulator for continuous ink jet print head, comprising the steps of:

(a) providing a body of high acoustic Q material;

(b) treating the surface of said body to produce a finish having a roughness of 100 to 200 microinches RMS;

(c) providing a plurality of piezoelectric strips; and (d) attaching said strips to said surface with an acrylic cement having a viscosity of between 2 and 100 centipois.

5. The method claimed in claim 4, wherein said treating step comprises sandblasting.

6. The method claimed in claim 4, wherein acrylic cement is cyanoacrylate having an uncured viscosity of 2 centipois.

* * * * *